RADIO TRANSMISSION SYSTEM AND TRANSMITTER AND RECEIVER FOR TRANSMISSION OF STEREOPHONIC SIGNAL TO BE USED IN THIS SYSTEM

Filed June 7, 1967

INVENTOR.
MAX WEEDA
BY
[signature]
AGENT

RADIO TRANSMISSION SYSTEM AND TRANSMITTER AND RECEIVER FOR TRANSMISSION OF STEREOPHONIC SIGNAL TO BE USED IN THIS SYSTEM

Filed June 7, 1967 2 Sheets-Sheet 2

INVENTOR.

MAX WEEDA

BY

Frank R. Trifari

AGENT 3,534,172
Patented Oct. 13, 1970

3,534,172

RADIO TRANSMISSION SYSTEM AND TRANSMITTER AND RECEIVER FOR TRANSMISSION OF STEREOPHONIC SIGNAL TO BE USED IN THIS SYSTEM

Max Weeda, Emmasingel, Eindhoven, Netherlands, assignor, by mesne assignments, to U.S. Philips Corporation, New York, N.Y., a corporation of Delaware Filed June 7, 1967, Ser. No. 644,192
Claims priority, application Netherlands, June 18, 1966, 6608507
Int. Cl. H04h *5/00*
U.S. Cl. 179—15 17 Claims

ABSTRACT OF THE DISCLOSURE

A transmission system is described in which conventional stereophonic FM equipment is modified so that it can alternatively be employed to handle a pair of independent signals. One of the independent signals is transmitted in the same manner as the *L+R* signal, while the other independent signal is phase modulated on the subcarrier. In its simplest form, the receiver modification merely requires the addition of output circuit switches.

The invention relates to a radio transmission system and to transmitters and receivers to be used therein for transmission of stereophonic signals in the form of the sum signal *L+R* of the coherent stereophonic signals L and R and the difference signal *L—R* of said coherent stereophonic signals amplitude-modulating with suppressed carrier wave a subcarrier frequency F together with a pilot signal of half the subcarrier frequency, which composed stereophonic signals modulate in frequency a main carrier frequency in a frequency modulator, the receiver end being provided with a frequency detector to the output circuit of which is connected on the one hand a pilot channel including a frequency doubling device for locally recovering the subcarrier frequency F and on the other hand a stereophonic reproduction device fed by the output signal of the pilot channel for recovering the coherent stereophonic signals L and R. The radio transmission system of said kind is known under the name of FCC-system.

The invention has for an object to enlarge the field of uses of the said radio transmission system in that by a comparatively small modification of the mode of transmission, whilst retaining the possibility of transmitting stereophonic signals, this radio transmission system is also rendered suitable for the transmission of two independent signals A and B, the amount of crosstalk between these two independent signals being reduced to a particularly low value, whilst at the receiver end only a small modification is required to permit of audibly reproducing these independent signals.

The transmission system according to the invention is characterized in that the transmitter has two separate channels for the transmission of the relatively independent signals A and B, the first channel transmitting the signal A and the second channel including a phase modulator the modulation signal of which is constituted by the signal B, whilst the output signals of these two channels, consisting of the signal A and the signal B phase-modulating a subcarrier frequency equal to the subcarrier frequency F for stereophonic transmission, are applied together with a pilot signal of half the subcarrier frequency as modulation signal to the frequency modulator and at the receiver end two separate channels are connected to the output circuit of the frequency detector, which channels include a separation filter and a phase detector, respectively, for recovering the relatively independent signals A and B, the pilot channel including the frequency-doubling device supplying the locally produced subcarrier frequency F for phase detection being connected to the phase detector, whilst the independent signal A is derived from the separation filter in the first channel and the independent signal B from the output of the phase detector in the second channel.

The invention and its advantages will now be described with reference to the figures.

Figure 1:
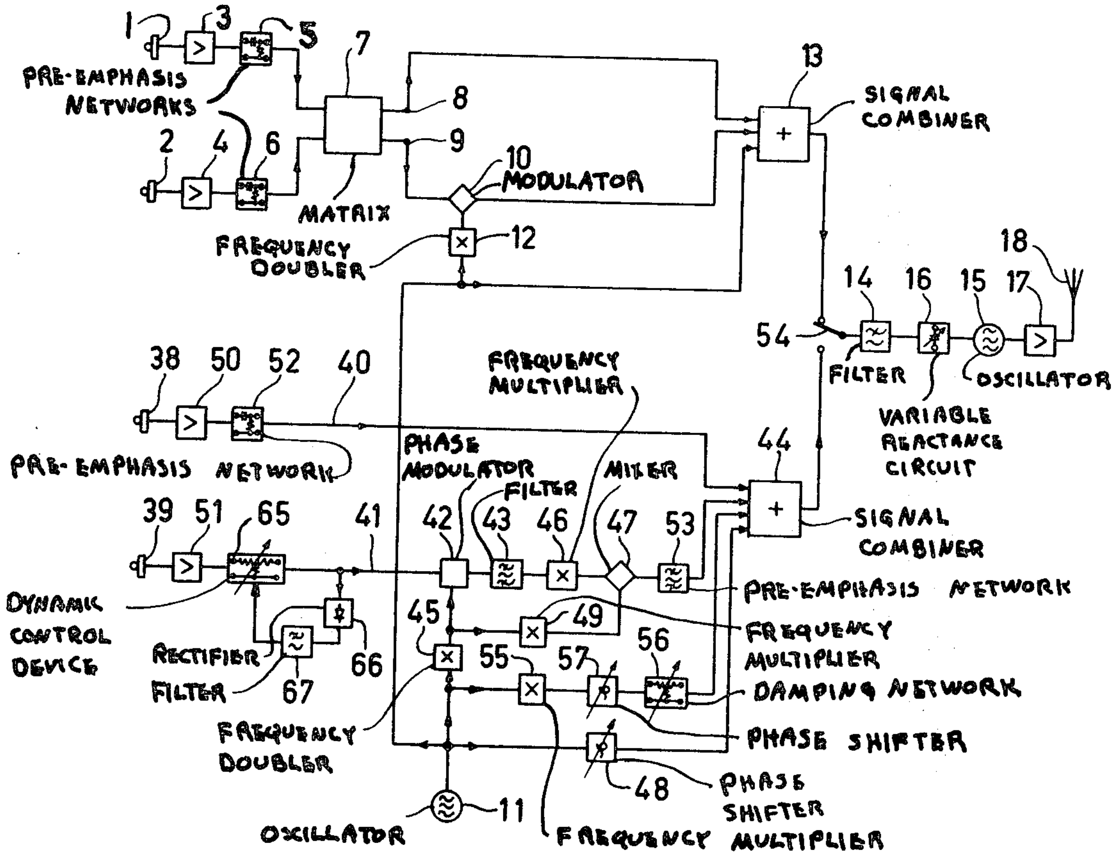
FIG. 1 shows a transmitter according to the invention.

FIG. 1 shows a radio transmitter according to the invention in which the coherent stereophonic signals L and R lying, for example, in the frequency band of 0.03 kc./s. to 15 kc./s. and originating from microphones 1, 2 are applied through amplifiers 3, 4 and pre-emphasis networks 5, 6 to a matrix network 7 comprising an adding and subtraction device. Thus, the sum signal *L+R* and the difference signal *L—R* of the coherent stereophonic signals L and R appear at output terminals 8, 9 of the matrix network 7, the difference signal *L—R* being applied as a modulation signal with suppressed carrier wave to an amplitude modulator 10, for example, in the form of a ring modulator, to which amplitude modulator 10 is also applied a subcarrier frequency of 38 kc./s. which is obtained by doubling the frequency of an oscillator 11 of 19 kc./s. in a frequency-doubling device 12.

The sum signal *L+R* originating from the output terminal 8 of the matrix network 7, the output signal of the amplitude modulator 10 with suppressed carrier wave and as pilot oscillation the oscillation produced by the oscillator 11 are applied through a combination device 13 and a low-bandpass filter 14 having a cut-off frequency of, for example, 60 kc./s. for frequency modulation to a frequency modulator constituted by a variable reactance 16 coupled with the frequency-determining circuit of an oscillator 15. For example, in the embodiment shown, the oscillator frequency of 96 mc./s. is frequency-modulated with a frequency sweep of 75 kc./s., the frequency-modulated oscillations being transmitted by a transmitter aerial 18 after amplification in an output amplifier 17.

Figure 3A:
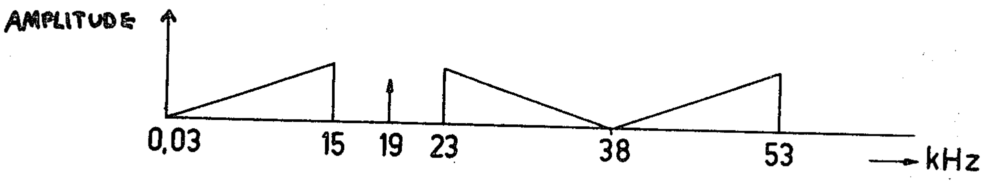
FIG. 3 illustrates a few frequency diagrams for explaining the operation of the devices shown in FIGS. 1 and 2.

For illustration, FIG. 3*a* shows in a frequency diagram the modulation signal for the frequency modulator 15, 16, which signal is composed, as is apparent from the figure, of the sum signal *L+R* in the frequency band of 0.03 to 15 kc./s., the difference signal *L—R* modulating with suppressed carrier wave the subcarrier frequency of 38 kc./s. in the frequency band of 23 to 53 kc./s. and the pilot signal of 19 kc./s. According to the FCC recommendations, the power division of the signals in this order of succession is 20:10:1 in the absence of L or R.

Figure 2:
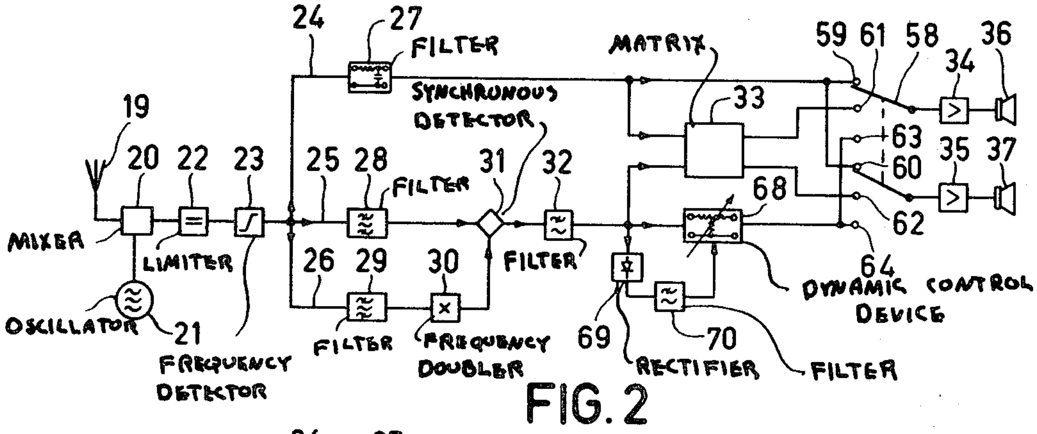
FIG. 2 shows a receiver co-operating with this transmitter.

FIG. 2 shows the receiver co-operating with the transmitter of FIG. 1 which is provided with a receiver aerial 19 and the intermediate-frequency stage 20 having a mixer stage joined by a local oscillator 21, the intermediate-frequency oscillations of said oscillator obtained by mixing lying, for example, in the frequency band of 10,700 kc./s. After amplification in an intermediate-frequency amplifier of the intermediate-frequency stage 20, the intermediate-frequency oscillations are applied through a limiter 22 to a frequency detector 23 of a type commonly used for the detection of normal FM transmissions, an output voltage of the wave form shown in FIG. 3*a* then appearing at the output impedance of the frequency detector 23.

In order to recover the coherent stereophonic signals L and R from the output voltage shown in FIG. 3*a*, these signals are applied to a device the input of which includes three parallel-connected channels 24, 25, 26 each including separation filters 27, 28, 29 which separation filters 27, 28, 29 pass in this order of succession solely the sum signal $L+R$ in the band of 0.03 to 15 kc./s., the difference signal $L-R$ modulating with suppressed carrier wave the subcarrier frequency of 38 kc./s. in the band of 23–53 kc./s. and the pilot signal 19 kc./s. In the embodiment shown, the response curves of the separation filters 27, 28 are such that said filters 27, 28 not only fulfill a separating function, but also bring about deemphasis, whilst a frequency doubler 30 for locally producing the subcarrier frequency of 38 kc./s. is included in the channel 26 serving as pilot channel.

In order to recover the stereophonic signals L and R, the difference signal $L-R$ modulating with suppressed carrier wave the subcarrier frequency is applied in channel 25 to a synchronous detector 31, for example, in the form of a ring modulator with an associated output filter 32, the carrier wave of 38 kc./s. locally produced in the pilot channel 26 also being applied to the synchronous detector 31. Thus, the detected difference signal $L-R$ appears at the output terminals of the synchronous detector 31, which difference signal is applied together with the sum signal $L+R$ to a matrix network 33 composed of an adding and subtraction device. In this manner, the coherent stereophonic signals L and R are recovered which are then applied through output terminals of the matrix network 33 and low-frequency amplifiers 34, 35 to reproduction devices 36, 37. If desired, a crosstalk-compensating network may be connected between the low-frequency amplifiers 34 and 35.

If the transmission mode described so far should also be applied to the transmission of two independent signals A and B, it is found that the relative crosstalk is very detrimental to an independent reproduction of the signals A and B. The crosstalk from the signal modulating the subcarrier frequency to the other signal transmitted without auxiliary modulation is particularly disturbing.

After extensive investigations, the applicant has found that this crosstalk is mainly due to the fact that the envelope of strongly varying amplitude of the signal modulating with suppressed carrier wave the subcarrier frequency produces in the frequency modulator 15, 16 a correspondingly strongly varying frequency sweep so that in dependence upon the amplitude variations of the envelope strong amplitude variations of the received frequency-modulated oscillations in the intermediate-frequency circuits of the receiver stage 20 are produced, which results in distorted but intelligible crosstalk to the other signal due to detection phenomena caused by non-linear effects. Depending upon the construction of the receiver, this intelligible crosstalk is found to be approximately 40 to 50 db.

According to the invention, with transmission of two independent signals A and B, this crosstalk is considerably reduced in that the transmitter (cf. FIG. 1) includes for the transmission of the relatively independent signals A and B originating from microphones 38, 39 two separated channels 40, 41, the first channel 40 transmitting the signal A from the microphone 38 and the second channel 41 including a phase modulator 42 and an associated output filter 43 the modulation signal of which is constituted by the signal B from the microphone 39, whilst the output signals of the two channels 40, 41 consisting of the signal A and the signal B phase-modulating a subcarrier frequency of 38 kc./s. are applied together with a pilot signal of half the carrier frequency originating from oscillator 11 through a combination device 44 and the low-bandpass filter 14 as a modulation signal to the frequency modulator 15, 16. In the embodiment shown, a carrier frequency of 38 kc./s. linearly phase-modulated in the phase modulator 42 through a small phase sweep of, for example, 10° is applied to the phase modulator 42 through a frequency doubler 45, whilst for increasing the phase sweep the phase modulator 42 is followed by a frequency multiplier 46 having a multiplication factor 8, the carrier frequency of 8×38 kc./s.=304 kc./s. obtained by frequency multiplication being transposed in a mixer stage 47 to 38 kc./s. by a carrier oscillation of 7×38 kc./s.=266 kc./s. originating from a frequency multiplier 49 connected to the frequency doubler 45. The channels 40, 41 both include low-frequency amplifiers 50, 51 and pre-emphasis networks 52, 53 and the conductor from the oscillator 11 to the combination device 44 includes an adjustable phase shifter 48 in order to ensure that the local carrier oscillation produced in the receiver by frequency doubling has the correct phase for phase detection.

By means of a switch 54 connected to the input of the low-bandpass filter 14, it is possible to change over according to desire to the stereophonic transmission according to the FCC system or to a transmission of two independent signals A and B.

Figure 3B:
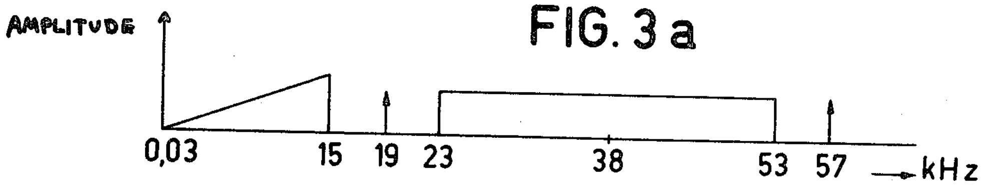

For comparison with the stereophonic transmission according to the FCC system illustrated in the frequency diagram of FIG. 3*a*, FIG. 3*b* shows the modulation signal for the frequency modulator 15, 16 in the case of transmission of two independent signals A and B. As will appear from this figure, the frequency band of 0.03 to 15 kc./s. which in stereophonic transmission is used for the transmission of the sum signal $L+R$, is used in this case for the transmission of the independent signal A, whilst the frequency band of 23–53 kc./s. used in stereophonic transmission for the transmission of the difference signal $L-R$ modulating with suppressed carrier wave the subcarrier, is utilized in this case for the transmission of the subcarrier of 38 kc./s. phase-modulated by the independent signal B. The power division between the independent signal A, the subcarrier phase-modulated by the independent signal B and the pilot signal of 19 kc./s. then is 50:10:1.

By the illustrated comparatively small modification of the transmission mode, the field of uses is considerably enlarged, whilst the disturbing crosstalk from signal B to signal A is considerably reduced. Whereas, as explained above, in the FCC system this crosstalk is due to the strongly amplitude variations of the envelope of the difference signal modulating the subcarrier oscillation, the amplitude of the subcarrier oscillation phase-modulated by the independent signal B just has a constant value. On the one hand, the amount of crosstalk is thus reduced considerably, for example, by 20 db, and on the other hand the distorted but intelligible crosstalk is converted to unintelligible crosstalk of a noisy nature. Due to these two effects, viz the reduction of the crosstalk factor and the conversion of the intelligible crosstalk to the unintelligible crosstalk, disturbing crosstalk no longer occurs.

A further development of the invention consists in that an additional oscillation of 57 kc./s. is simultaneously transmitted by means of a frequency multiplier 55 coupled with the oscillator 11, this oscillation and the pilot oscillation of 19 kc./s. being symmetrical to the subcarrier oscillation of 38 kc./s. (cf. FIG. 3*b*). For, if the amplitude of the additional oscillation of 57 kc./s. is rendered equal to that of the pilot oscillation of 19 kc./s. by means of an adjustable damping network 56, and if the phase is adjusted by an adjustable phase-shifting network 57 so that these two oscillations of 19 kc./s. and 57 kc./s. together may be considered as components of the phase-modulated carrier oscillation of 38 kc./s., it is achieved the amplitude of the sum of these components of 19 kc./s. and 57 kc./s. with the phase-modulated signal in the band of 23 to 53 kc./s. has a constant value, which has a particularly favourable effect on the reduction of disturbances and crosstalk.

By the steps in accordance with the invention, not only the field of uses is enlarged and the disturbing crosstalk is considerably reduced, but moreover only a minimum number of modifications in the FCC receiver is required to permit of audibly reproducing the independent signals A and B. More particularly, to the output of the frequency detector 23 are connected two separate channels constituted by the channels 24, 25 which are already used for stereophonic transmission and which include a separation filter and a phase detector, respectively, for recovering the independent signals A and B, whilst the pilot channel 26 including the frequency doubler 30 supplying the locally produced subcarrier frequency for phase detection is connected to the phase detector. The separation filter 27 is utilized for recovering the independent signal A and the synchronous detector 31 is used for detection of the independent signal B, since the phase sweep is smaller than 90° so that without the use of additional means the independent signal A appears at the output of the filter 27 and the independent signal B appears at the output of the synchronous detector 31.

In order to permit of adjusting according to desire to the reproduction of the independent signals A and B or to stereophonic reproduction, provision is made of a three-position switch 58 having contacts 59, 60; 61, 62; 63, 64, the contacts 59, 60 being connected to the filter 27 in the channel 24, the contacts 61, 62 to the output terminals of the matrix network 33 and the contacts 63, 64 to the output of the synchronous detector 31. If by means of the switch 58 the reproduction devices 36, 37 are connected to the contacts 59, 60, a reproduction of the independent signal A or a monaural reproduction is obtained, whilst in the case of connection with the contacts 61, 62 a stereophonic reproduction and in the case of connection with the contacts 63, 64 a reproduction of the independent signal B is obtained. With reproduction of the independent signals A and B, the connections of the channel 24 and the output of the synchronous detector 31 with the matrix network 33 may be interrupted by means of a switch.

Thus, with a minimum number of modifications the field of uses of the sterephonic receiver is considerably enlarged, so that beside a stereophonic reproduction, according to desire one of the independent signals A and B can be reproduced.

As stated above, in the transmission system described so far, a certain, though much less disturbing amount of crosstalk still occurs from the independent signal A to the independent signal B transmitted by phase modulation and this is due to harmonic distortions in the independent signal A caused by non-linear effects.

In order to obtain also in this case an excellent reproduction quality of the independent signal B, it is proposed to include at the receiver end in the channel 41 transmitting the independent signal B a dynamic compressor and in the corresponding receiving channel a dynamic expander. More particularly, the dynamic compressor is constituted by a dynamic control device 65 composed, for example, if diodes, transistors of tubes acting as variable resistance, the output voltage of the dynamic control device 65 supplying, after rectification in a dynamic rectifier 66 with an associated low-bandpass filter 67, the compression control voltage, whilst the dynamic expander at the receiver end also includes a dynamic control device 68 controlled by a dynamic rectifier 69 with an associated low-bandpass filter 70 connected to the input of said dynamic control device 68.

With a moderate compression and expansion control and an accordingly simple construction of the dynamic compressor and the dynamic expander, the amount of crosstalk is already reduced by 15 db, whilst the detrimental effects on the quality by noise and other disturbances are also considerably reduced. In the receiver according to the invention, even a greater freedom of disturbances is obtained with the transmission of the independent signals A and B than with stereophonic transmission.

As a matter of course, several embodiments of the transmitter and receiver shown in FIGS. 1 and 2, respectively, are possible without leaving the scope of the invention.

Figure 4:
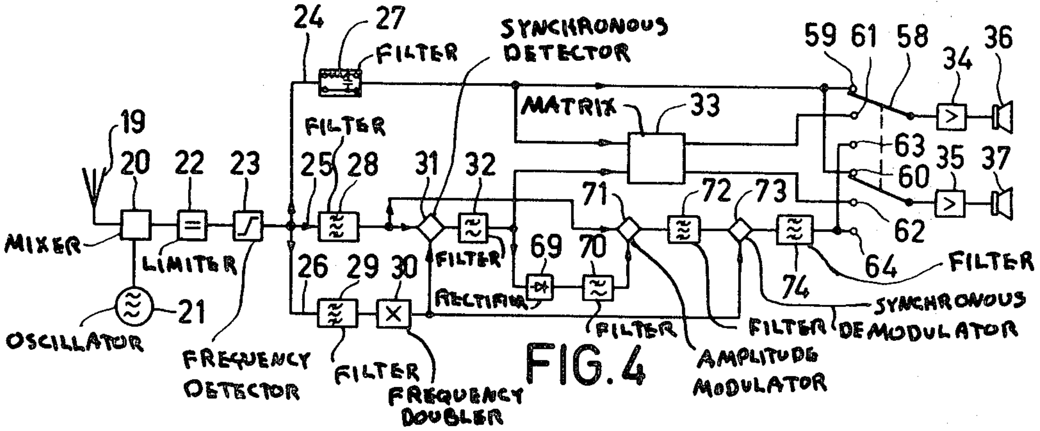
FIG. 4 shows a modification of a receiver according to the invention.

FIG. 4 shows an alternative embodiment of a receiver according to the invention which is distinguished from the receiver of FIG. 2 by the construction of the dynamic expander. Corresponding parts are denoted by the same reference numerals.

In this embodiment, the dynamic control voltage originating from the dynamic rectifier 69 with associated low-bandpass filter 70 is applied as modulation signal to an amplitude modulator 71 with an associated output filter 72, the phase-modulated signal separated in the filter 28 being utilized as carrier oscillation. The phase-modulated signal which appears at the output of the amplitude modulator 71 and which is amplitude-modulated by the dynamic control voltage is applied to a synchronous detector 73 with a low-bandpass filter 74, this synchronous detector 73 being controlled by the local carrier oscillation originating from frequency doubler 30. In this case, not only detection of the phase-modulated oscillations, but also a dynamic expansion is obtained.

The special expander construction shown has the advantage of an optimum freedom of distortions in the dynamic expansion.

Figure 5:
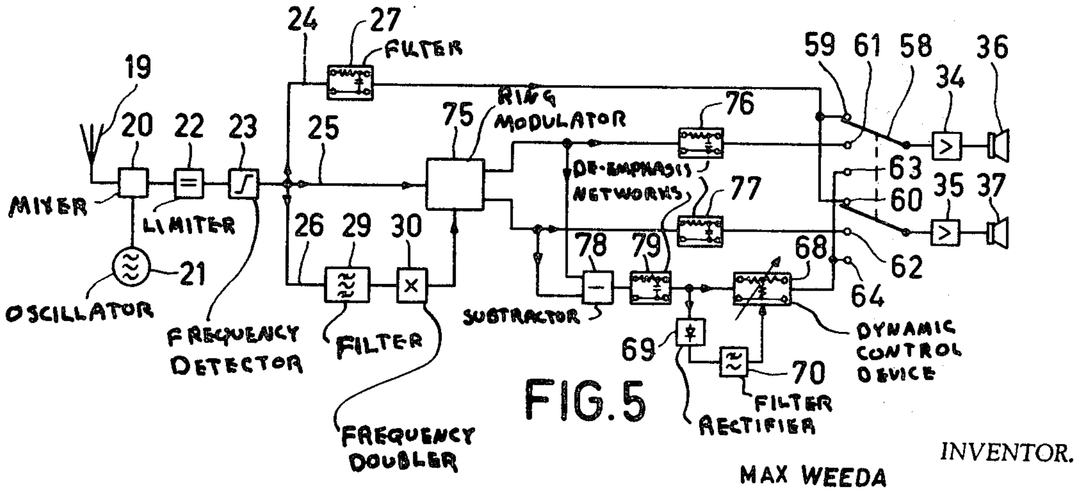
FIG. 5 shows an alternative embodiment of a receiver according to the invention.

FIG. 5 shows an alternative embodiment of a receiver according to the invention which is distinguished from the receivers described above by the construction of the stereophonic reproduction device. Parts corresponding with those in FIG. 2 are denoted by the same reference numerals.

In this receiver, a stereophonic reproduction device 75 is used as described in the British patent specification 1,022,769. More particularly, the stereophonic reproduction device 75 is consituted by a synchronous detector having the form of a ring modulator, whilst the incoming stereophonic signals consisting of the sum signal $L+R$ and the difference signal $L-R$ modulating with suppressed carrier wave the subcarrier frequency together with the locally produced subcarrier oscillation of 38 kc./s. as switching signal are applied without frequency separation to one pair of diagonal points. As has been described in greater detail in the said patent specification, the separated coherent stereophonic signals L and R appear at the remaining diagonal points and are applied to the reproduction devices 36, 37 through output conductors including de-emphasis networks 76, 77.

This stereophonic reproduction device also may be utilized for recovering the independent signals A and B. For, if the independent signal A and the signal B phase-modulating the subcarrier frequency are applied in common to the ring modulator 75 and if the output conductors of the ring modulator 75 are connected to a subtraction device 78, solely the independent signal B appears at the output of the subtraction device 78. The subtraction device 78 then acts as a compensation network for the occurring components of the independent signal A.

The separated signal B at the output of the subtraction device 78 is applied through a de-emphasis network 79 and a dynamic expander 68, 69, 70 to the contacts 63, 64 of the three-position switch 58.

What is claimed is:

1. A radio transmission system comprising a transmitter and a receiver, said transmitter comprising a source of a sum signal and a difference signal of coherent stereophonic signals, a source of independent first and second input signals, a source of pilot oscillations, means for multiplying the frequency of said pilot oscillations to produce subcarrier oscillations, means for amplitude modulating said difference signal on said subcarrier oscillations with suppressed carrier, means for adding said sum signal, amplitude modulated subcarrier oscillations, and pilot signal to produce a first output signal, means for phase modulating said unmodulated subcarrier oscillations with said second input signal, means for adding said first input signal, said phase modulated subcarrier oscillations, and said pilot oscillations to produce a second output signal, and frequency modulator means connected to selectively transmit said first and second output signals in the form of frequency modulation on a carrier, said receiver comprising means for receiving and frequency demodulating said transmitted signals, first, second and third channels, filter means for separating said demodulated signals and applying signals below the frequency of said pilot oscillations to said first channel, signals in the modulation band of said subcarrier oscillations to said second channel, and said pilot oscillations to said third channel, said third channel comprising means for multiplying said pilot oscillations, said second channel comprising synchronous demodulator means for demodulating the signals applied thereto, means applying said multiplied oscillations from said third channel to said demodulator as a reference signal, means for deriving said first and second input signals from said first and second channels respectively, and means connected at least to said second channel for separately deriving said coherent stereophonic signals.

2. A radio transmission system comprising a source of a sum signal and a difference signal derived from coherent stereophonic signals, a source of independent first and second input signals, a source of pilot oscillations, means for multiplying the frequency of said pilot oscillations to produce unmodulated subcarrier oscillations, means for amplitude modulating said difference signal on said subcarrier oscillations with suppressed carrier, means for adding said sum signal, amplitude modulated subcarrier oscillations, and pilot signal to produce a first output signal, means for phase modulating said unmodulated subcarrier oscillations with said second input signal, means for adding first input signal, said phase modulated subcarrier oscillations, and said pilot oscillations to produce a second output signal, and frequency modulator means connected to selectively transmit said first and second output signals in the form of frequency modulation on a carrier.

3. A radio transmitter as claimed in claim 2 further comprising a second frequency multiplier having an input and an output, said input being coupled to said phase modulator and means for changing the multiplied carrier frequency to the frequency of the subcarrier oscillation coupled between said output of said second multiplier and said second mentioned adding means.

4. A radio transmitter as claimed in claim 2 wherein the phase sweep of the subcarrier wave phase-modulated by the second input signal is smaller than 90°.

5. A radio transmitter as claimed in claim 2 further, comprising means for simultaneously transmitting an additional oscillation, said additional oscillation and the smultaneously transmitted pilot frequency being frequency symmetrical to the subcarrier wave, the amplitude of said additional oscillation being equal to that of the pilot oscillation, and means for phase adjustment of the additional oscillation with respect to the pilot signal.

6. A radio transmitter as claimed in claim 2 further comprising a dynamic compressor coupled between said source of said second independent signal and said phase modulation means.

7. A radio transmitter as claimed in claim 6, wherein said dynamic compressor comprises a dynamic control device, a rectifier connected to the output of the dynamic control device and a filter coupling said rectifier to said device.

8. A transmitter as claimed in claim 2 wherein said multiplying means multiplies by a factor of two.

9. A radio receiver comprising means for receiving and frequency demodulating transmitted signals having a pilot and first and second information signals, said second information signal modulating subcarrier oscillations, first, second and third channels, filter means for separating said demodulated signals and applying signals below the frequency of said pilot signal to said first channel, signals in the modulation band of said subcarrier oscillations to said second channel, and said pilot oscillations to said third channel, said third channel comprising means for multiplying said pilot signal, said second channel comprising synchronous demodulator means for demodulating the signals applied thereto, means applying said multiplied signal from said third channel to said synchronous demodulator as a reference signal, means for deriving said first and second information signals from said first and second channels respectively, and means connected at least to said second channel for separately deriving coherent stereophonic signals.

10. A radio receiver as claimed in claim 9, further comprising a switch having contacts to which audio output means are connected and which are connectable respectively to the output of the separation filter in the first channel, the output terminals of the stereophonic deriving means, and the output of the synchronous detector in the second channel.

11. A receiver as claimed in claim 9 wherein said deriving means comprises a matrix coupled to said first and second channels.

12. A receiver as claimed in claim 9 wherein said multiplying means multiplies by a factor of two.

13. A receiver as claimed in claim 9 wherein said third channel further comprises an automatic level control means.

14. A receiver as claimed in claim 13 wherein said level control means comprises a rectifier coupled to said third channel, a second filter coupled to the output of said rectifier, and a dynamic control device coupled to said third channel and controlled by the output of said second filter.

15. A receiver as claimed in claim 13 wherein said level control device comprises an amplitude modulator receiving the output of filter means applied to said second channel, means for generating a signal indicative of the average output of said synchronous detector coupled to said amplitude modulator, and a second synchronous detector receiving the output of said amplitude modulator and said multiplied pilot signal.

16. A receiver as claimed in claim 9 wherein said synchronous detector comprises a ring modulator and said deriving means comprises output terminals of said synchronous detector and a subtraction means coupled to said output terminals.

17. A receiver as claimed in claim 16 comprising an automatic level control device couplied to the output of said subtraction means.

References Cited

UNITED STATES PATENTS 3,069,505 12/1962 Collins et al. ---------- 179—15

KATHLEEN H. CLAFFY, Primary Examiner

D. L. STEWART, Assistant Examiner

U.S. Cl. X.R.

325—36